Patented Aug. 5, 1952

2,605,509

UNITED STATES PATENT OFFICE 2,605,509

METHOD OF PRODUCING ELASTIC THREAD

Robert R. Dreisbach, Midland, Mich., assignor to The Dow Chemical Company, Midland, Mich., a corporation of Delaware No Drawing. Application August 10, 1945, Serial No. 610,193

5 Claims. (Cl. 18—54)

This invention relates to making elastic thread from rubber-like diolefin copolymers.

The production of elastic thread from natural rubber by the dry-extrusion of compounded stock is not practical, the extruded filaments being non-uniform and very weak, even after curing. As a result, elastic rubber threads are made commercially only by complex procedures, such as wet-spinning latex into a coagulant liquid, or forming rubber sheet and slitting it. (These known processes are summarized, for example, in U. S. Patent 2,338,978.)

It has now been found, however, contrary to experience with natural rubber, that certain rubber-like diolefin copolymers, when compounded, can readily be dry-extruded to form thread which is of excellent uniformity and, after curing, exhibits high strength, good elasticity, and low permanent set.

This finding is the basis of the present invention, which provided a simple method for the production of elastic thread having physical properties approximating or even exceeding those of the natural rubber thread produced by more elaborate processes.

The rubber-like materials to which the new process is applicable are essentially the copolymers of lower aliphatic conjugated diolefins, such as butadiene, with alpha-methylene-lower alkyl aromatic compounds, such as styrene, with or without lower alkyl alpha-methylene-lower alkyl ketones, e. g. methyl isopropenyl ketone, as third components. In the invention, any of these copolymers is mixed with conventional rubber-compounding agents to produce a vulcanizable plastic composition which is dry-extruded through small orifices. The resulting extruded filaments are then cured, as by heating, to form elastic threads.

The lower aliphatic conjugated diolefin component of the copolymer used in the invention is ordinarily butadiene-1,3, although isoprene, 2-ethyl butadiene-1,3, and 2,3-dimethyl butadiene-1,3 may be substituted for all or a part of it. The alpha-methylene-lower alkyl aromatic compound is preferably styrene; however, alpha-methyl-styrene, alpha-ethyl-styrene, o-, m-, or p-methyl styrene, o-, m-, or p-ethyl-styrene, p-isopropyl styrene, o-, m-, or p-chlorostyrene, vinyl naphthalene, vinyl ethyl naphthalene, and other materials of this class are also operable. The lower alkyl alpha-methylene-lower alkyl ketone is conveniently methyl isopropenyl ketone, although methyl vinyl ketone, ethyl vinyl ketone, methyl alpha-ethyl-vinyl ketone, isopropyl vinyl ketone and the like, may be employed.

In general, satisfactory elastic threads are obtained according to the invention when the rubber-like copolymers are those produced by interpolymerizing the monomers in the following proportions by weight:

| | |
|---|---|
| Conjugated diolefin | 1.0 |
| Alpha-methylene-alkyl aromatic compound | 0.015 to 0.8 |
| Alkyl alpha-methylene-alkyl ketone | 0.0 to 1.6 |

The group of copolymers preferred in the invention are those containing in combined form 1.0 part of butadiene, 0.015 to 0.8 part of styrene, and 0.3 to 1.6 parts of methyl isopropenyl ketone. Within this range optimum results are achieved with 0.08 to 0.65 part of styrene and 0.4 to 1.2 parts of methyl isopropenyl ketone per part of butadiene. These copolymers, known as "Elastomer S," are described in detail in my U. S. Patent 2,374,589, to which reference is hereby made.

Another group of operable copolymers are those obtained by polymerizing 1.0 part of butadiene with 0.1 to 0.7 part of styrene, the optimum proportions being 0.25 to 0.67 part of the latter. These materials are known commercially by the names "Buna-S," "GR-S," "Chemigum-S," and "Hycar-OS." The basic composition is characterized in U. S. Patents 1,938,730 and 1,938,731.

The rubber-like copolymers used in the invention are prepared by conventional methods, i. e. by polymerizing mixtures of the monomers en masse or in solution, or preferably in an aqueous emulsion, at elevated temperatures, usually below 100° C. Details of the polymerization methods are known in the art, and form no part of the present invention.

In practice of the invention, a rubber-like diolefin copolymer of the type explained is mixed thoroughly with rubber-compounding agents to form a vulcanizable plastic mass, as by working the ingredients together on a compounding mill.

In so far as known, any of the compounding agents conventionally used with natural rubber, especially fillers, such as carbon black and zinc oxide, vulcanizing agents, e. g. sulfur, accelerators, stabilizers, and plasticizers, may be added to the rubber-like copolymers of the invention. The selection and proportioning of these ingredients is made according to principles well established in the rubber art, it being preferable to choose the compounding agents so as to secure a vulcanizable material having a curing time of at most an hour or two.

The compounded plastic mass is shaped into threads by dry-extrusion, usually by means of a screw-feed extrusion press. The press is ordinarily fitted with a die having one or more circular orifices, usually of a diameter below 0.050 inch, although threads of other cross-sectional shapes may be formed if desired by providing a suitable die. Best results are obtained when the extrusion press has a low inventory and the screw is of the type providing maximum forwarding action with minimum working of the plastic. The compound to be extruded is ordinarily fed to the screw at room temperature, and the temperature of the press is preferably controlled so that the plastic is not heated over 100° to 125° C. at any point. Under these conditions, extrusion proceeds very smoothly; threads of uniform diameter and excellent appearance are readily produced.

Following extrusion, the thread is cured, usually by heating at an elevated temperature of 100° to 175° C., e. g. about 150° C., for 0.3 to 2 hours, as required. It is preferable during curing to exclude air from contact with the hot thread, as by operating in an atmosphere of inert gas or in vacuum.

Curing may be effected either by passing the thread as it is extruded through a heated tunnel for a time sufficient to effect a cure, and then spooling it, or by spooling the thread and curing it while spooled. In the latter case, it is desirable to coat the thread with talc or a soap film before spooling to prevent the threads from adhering to one another during the curing step.

After curing, the thread has considerable strength and high elongation, and is ready for service in most of the applications to which natural rubber thread has been placed.

The extrusion process, in addition to shaping the rubber compound into thread, imparts added strength thereto, so that cured thread is frequently found to have from 50 to 100 per cent higher tensile strength than cured test specimens of unextruded stock.

The following examples will further illustrate the invention, but are not be be construed as limiting its scope.

Example 1

The copolymer used was an "Elastomer S" produced by interpolymerization of 1.0 part by weight of butadiene, 0.37 part of styrene, and 1.12 parts of methyl isopropenyl ketone, in aqueous emulsion. A weight of 100 parts of this copolymer was compounded on rolls with 40 parts of "Gastex" furnace black, 5 parts of zinc oxide, 2.5 parts of sulfur, 1 part of mercaptobenzothiazole, 1 part of stearic acid, and 20 parts of dibutyl sebacate.

The resulting vulcanizable plastic composition was forced through a 0.030-inch circular orifice in a die mounted on an extrusion press having a 0.5-inch diameter screw 3.5 inches long operating at 50 R. P. M. The thread issued at about 8 feet per minute at a temperature of about 90° C., had a diameter of 0.031 inch, and weighed about 0.008 ounce per foot. It was coated with talc, and spooled under practically no tension. The spools were then inserted in a vacuum oven at 150° C. for 1.0 hour to effect curing.

The resulting elastic thread was smooth-surfaced and of uniform diameter, and exhibited a tensile strength of 4570 pounds per square inch (based on the cross-section of the unstretched thread) and an elongation at breaking of 420 per cent. Even after aging in air more than 2 years, the thread retained substantially these original properties.

Example 2

The copolymer used was "Buna-S," a butadiene-styrene copolymer containing about 20 to 25 per cent of styrene.

One hundred parts of this copolymer was compounded with 40 parts of "Gastex" furnace black, 5 parts of zinc oxide, 2 parts of sulfur, 1 part of mercaptobenzothiazole, and 2 parts of stearic acid. The resulting stock was extruded and cured as in Example 1. The resulting thread had a tensile strength of 3790 pounds per square inch and an elongation of 480 per cent.

In the following claims, the term "lower alkyl" refers to radicals containing six or less carbon atoms. All proportions given are by weight.

What is claimed is:

1. The method of producing a rubber-like elastic thread which comprises: mechanically working at an elevated temperature and dry-extruding through a thread-forming orifice having a diameter below 0.050 inch a vulcanizable plastic composition consisting of a rubber-like copolymer of a mixture of 1.0 part of a lower aliphatic conjugated diolefin, 0.015 to 0.8 part of an alpha-methylene-lower alkyl aromatic compound, and 0.0 to 1.6 parts of a lower alkyl alpha-methylene-lower alkyl ketone, together with rubber-compounding and vulcanizing agents; and curing the resulting extruded thread while preventing it from adhering to like thread during the curing step.

2. The method of producing a rubber-like elastic thread which comprises: mechanically working at an elevated temperature below 125° C. and dry-extruding through a thread-forming orifice having a diameter below 0.050 inch a vulcanizable plastic composition consisting of a rubber-like copolymer of a mixture of 1.0 part of butadiene, 0.015 to 0.8 part of styrene, and 0.3 to 1.6 parts of methyl isopropenyl ketone, together with rubber-compounding and vulcanizing agents; and heat-curing the resulting extruded thread while preventing it from adhering to like thread during the curing step.

3. A process according to claim 2 wherein the copolymer is a copolymer of 1.0 part of butadiene, 0.08 to 0.65 part of styrene, and 0.4 to 1.2 parts of methyl isopropenyl ketone.

4. The method of producing a rubber-like elastic thread which comprises: mechanically working at an elevated temperature below 125° C. and dry-extruding through a thread-forming orifice having a diameter below 0.050 inch a vulcanizable plastic composition consisting of 1.0 part of butadiene and 0.1 to 0.7 part of styrene, together with rubber-compounding and vulcanizing agents; and heat-curing the resulting extruded thread while preventing it from adhering to like thread during the curing step.

5. A process according to claim 4 wherein the copolymer is a copolymer of 1.0 part of butadiene and 0.25 to 0.67 part of styrene.

ROBERT R. DREISBACH.

REFERENCES CITED

The following references are of record in the file of this patent:

UNITED STATES PATENTS

| Number | Name | Date |
|---|---|---|
| 1,661,069 | Hartung | Feb. 28, 1928 |
| 2,135,395 | Holzapfel | Nov. 1, 1938 |
| 2,149,425 | Draemann | Mar. 7, 1939 |
| 2,156,909 | Boyer | May 2, 1939 |
| 2,170,439 | Wiezevich | Aug. 22, 1939 |
| 2,185,656 | Waterman et al. | Jan. 2, 1940 |
| 2,265,722 | De Nie | Dec. 9, 1941 |
| 2,288,982 | Waterman et al. | July 7, 1942 |
| 2,333,403 | Youker | Nov. 2, 1943 |
| 2,374,589 | Dreisbach | Apr. 24, 1945 |

FOREIGN PATENTS

| Number | Country | Date |
|---|---|---|
| 303,867 | Great Britain | Mar. 13, 1930 |

OTHER REFERENCES

Stocklin: "Buna" Transactions of Institute of Rubber Industry 1939, vol. 15, page 63.